(12) United States Patent
Strothmann

(10) Patent No.: US 6,371,281 B1
(45) Date of Patent: Apr. 16, 2002

(54) CONVEYOR DEVICE

(75) Inventor: Wilfried Strothmann, Schloss Holte-Stukenbrock (DE)

(73) Assignee: Wilfried Strothmann GmbH & Co. KG, Maschinenbau und Handhabungstechnik, Schloss Holte-Stukenbrock (DE)

( * ) Notice: Subject to any disclaimer, the term of this patent is extended or adjusted under 35 U.S.C. 154(b) by 0 days.

(21) Appl. No.: 09/568,393

(22) Filed: May 10, 2000

(30) Foreign Application Priority Data

May 10, 1999 (DE) .......................................... 199 21 519

(51) Int. Cl.[7] .............................................. B65G 25/08
(52) U.S. Cl. ..................... 198/721; 198/748; 198/832.1
(58) Field of Search ................................... 198/748, 790, 198/721, 832.1, 750.1, 750.7

(56) References Cited

U.S. PATENT DOCUMENTS

| | | | | | |
|---|---|---|---|---|---|
| 1,329,962 A | * | 2/1920 | Enis | ............................ | 198/721 |
| 1,934,835 A | * | 11/1933 | Weiss | ....................... | 198/832.1 |
| 1,946,452 A | * | 2/1934 | Bridges | .................... | 198/832.1 |
| 3,894,629 A | * | 7/1975 | Wakabayashi | .......... | 198/721 X |
| 4,098,395 A | * | 7/1978 | Olsson | ........................ | 198/748 |
| 4,154,334 A | * | 5/1979 | Ivanov et al. | ........... | 198/748 X |
| 4,175,656 A | * | 11/1979 | Lang | ........................... | 198/748 |

\* cited by examiner

Primary Examiner—Joseph D. Pape
Assistant Examiner—Patricia L Engle
(74) Attorney, Agent, or Firm—Richard M. Goldberg

(57) ABSTRACT

A conveyor device for position-precisely moving objects on a conveyor surface of the conveyor belt includes a plurality of forward feed elements (42) for taking hold of the objects by their rear bottom edge in relation to the forward direction. Tension members (32) which are endless or connected to an endless strand via the forward feed elements are provided for the purpose of moving the forward feed elements, and the tension members for moving the forward feed elements into a specified starting position can be driven by means of a common shaft (30) to be coupled separately with the tension members. When the forward feed elements are in the specified starting position, the tension members can be uncoupled from the common shaft (30) and each coupled with a separate linear drive (48,50) with the stroke of the desired length of displacement of the objects.

12 Claims, 2 Drawing Sheets

CONVEYOR DEVICE

BACKGROUND OF THE INVENTION

The invention relates to a conveyor device for position-precisely moving objects on a conveyor surface of the conveyor device, with a plurality of forward feed elements for taking hold of the objects by their rear bottom edge in relation to the forward direction.

In particular, the invention relates to a device for position-precisely aligning conveyed objects in relation to the conveyor surface, i.e. irrespective of any actual conveyor movement. In this context one should think of instances in which the conveyor itself is switched off, and the objects have to be moved to certain specified positions, or instances in which the objects have to be moved up against a stop projecting up out of the conveyor surface.

SUMMARY OF THE INVENTION

There already exist a range of prior art conveyor systems comprising a row of conveyor belts or roller conveyors or such like spaced at intervals, between which separate stops, forward feed elements and such like can be raised and lowered. This invention is basically also intended to build on on a system of this type.

The particular task of the invention is to provide a conveyor device of the above-mentioned type which, at little constructive cost, allows the forward feed elements to be brought into the starting position using what conveyor drive means are essentially available anyway, so that the actual forward feed movement can then be carried out.

According to the invention, this task is solved with a conveyor device of the above type in that tension members, which are endless or connected via the forward feed elements to an endless strand, are provided for the purpose of moving the forward feed elements, in that the tension members for moving the forward feed elements into a specified starting position can be driven by means of a common shaft to be coupled separately with the tension members, and in that when the forward feed elements are in the specified starting position, the tension members can be uncoupled from the common shaft and each coupled with a separate linear drive with the stroke of the desired length of displacement of the objects.

Said common shaft can be the shaft which drives the actual conveyor, i.e. which sets in motion parallel conveyor belts, roller conveyors or similar. This shaft, which can in turn be rotated by a single common motor, can be coupled with the tension members of the forward feed elements with the help of couplings, and can move the forward feed elements in such a way that they arrive in the desired specified starting position. Here the tension members are uncoupled from the shaft and recoupled with a stationary, simple linear drive such as an air cylinder, which then executes the desired forward movement.

Therefore, since the only thing needed to move the forward feed elements into the starting position is an additional belt pulley with coupling on the common drive shaft of the actual conveyor, with the actual forward movement being executed by means of simple, stationary air cylinders that do not, therefore, have to be dragged along as an inert weight, the additional constructive cost compared to a simple conveyor is low. Neither is it necessary according to this invention to run power lines to drive the forward feed elements.

If several adjacent forward feed elements have to be brought into starting positions, i.e. the object to be conveyed runs with its rear bottom edge at a right angle to the conveying direction, all the forward feed elements can be brought into position at the same time. If the rear edge runs at an oblique angle to the conveying direction, the individual tension members are consecutively coupled to the common shaft and the forward feed elements are brought into position one after the other. The linear drives, in particular air cylinders, can always remain in their stationary position, because they can take hold of the tension members in any position.

Other fluid cylinders, and possibly also hydraulic cylinders or spindle drives, can be used instead of air cylinders.

These linear drives, e.g. in the form of air cylinders, preferably have one end, i.e. the cylinder or the piston, mounted such that it is stationary, whilst the other end is connected with a coupling which is displaceably guided along the base, which allows the corresponding end of the linear drive to be rigidly connected with the tension member so that the tension member can be moved to and fro by the linear drive.

The tension member is preferably an endless tension member, in particular a belt, and, especially advantageously, a toothed belt. The coupling for connecting the linear drive and the tension member is preferably elastically pre-tensioned in the engagement position, and is uncoupled by air pressure, or hydraulically.

BRIEF DESCRIPTION OF THE DRAWINGS

Preferred embodiments of the invention will be described below with reference to the enclosed drawing.

DETAILED DESCRIPTION

Figure 1:
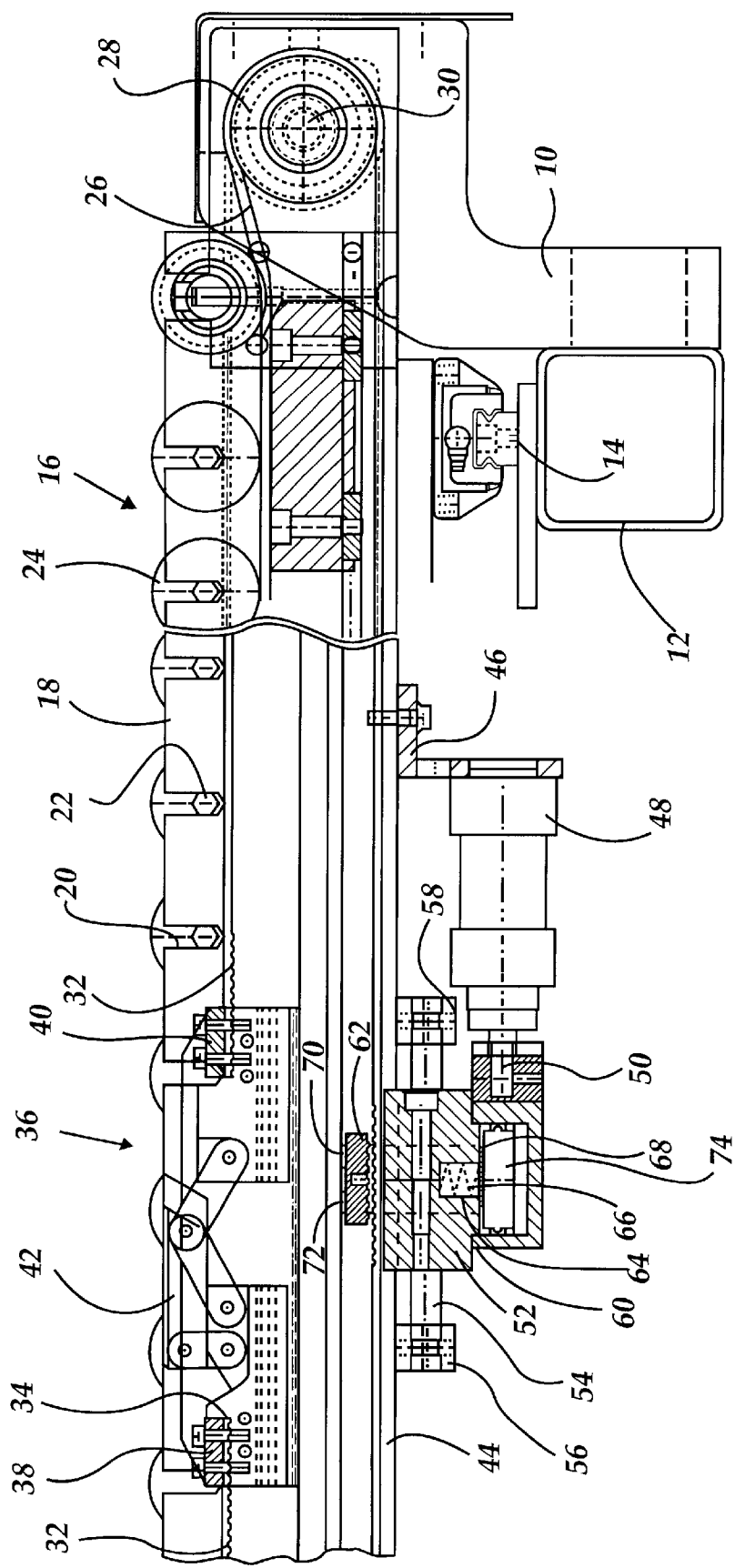
FIG. 1 shows a diagrammatic side view of a conveyor device according to the invention.

In the drawing, 10 denotes a support for a base for the conveyor. 12 denotes a cross bar of the frame in the form of a square profile running perpendicular to the plane of the drawing. On its top surface there is a track 14, onto which individual units consisting of a roller conveyor 16 and the elements of the forward feed device to be represented later on, can be mounted if, for example, the intention is to create a conveyor device of a certain width with several adjacent rows of rollers.

This description will essentially concentrate on the actual elements according to the invention. The roller conveyor designated by 16 consists of a track 18 running in the conveying direction in which perpendicular slots 20 are contrived from the top to accommodate the axles 22 of the individual rollers 24. The axles slide down into the slots, but do not rest on the bases. Instead, rollers 24 are supported by an endless toothed belt 26 which runs under the rollers and then around a toothed belt gear 28, which is mounted on a shaft 30 such that it cannot rotate.

This arrangement can be repeated over several rows perpendicular to the plane of the drawing. In doing so, all the toothed belt gears 28 can be driven by a common motor (not shown) via shaft 30. Toothed belt gears 28 are connected to shaft 30 such that they cannot rotate.

The toothed belt gears can also be disposed on shaft 30 such that they cannot be rotated, but can be moved longitudinally, so that the entire arrangement can be moved crosswise to the conveying direction and can be adjusted in line with the requirements of the individual moving operation and the shape of the objects to be conveyed.

Roller conveyors of this type are known of per se, so no further explanation is required here.

In front of or behind toothed belt gear 28, in relation to the depiction in the drawing, there is another toothed belt gear (not shown) of the same diameter, which also rests on shaft 30, but is not permanently connected with shaft 30, but only via a coupling which is not shown. This toothed belt gear drives a toothed belt 32, which is also an endless belt, but has a gap 34 in the left area of the drawing. Gap 34 is bridged by a thrust-latch mechanism 36, to which the two open ends of the toothed belt 32 provided with gap 34 are attached with the aid of clamping elements 38,40 in the manner illustrated in the drawing. The forward-thrust mechanism operates in that a forward feed latch, which forms the forward feed element of the invention and is denoted by 42, is raised above the conveyor surface when toothed belt 32 moves to the right, and is lowered into the position shown when the toothed belt moves to the left.

Whilst the gap 34 in toothed belt 32 and the bridging thrust-latch mechanism 36 are located in the upper strand of endless toothed belt 32, we will now consider the latter's lower strand. To the bottom side of a longitudinal frame part, denoted by 44, of the base of the conveyor, a bracket 46 is attached in a downwardly projecting position, and to this is attached a horizontally lying air cylinder 48 by its cylinder side, oriented towards the left in the drawing. The piston 50, which exits the air cylinder to the left, is attached to a coupling 52 via attaching elements which are not shown. This coupling 52 can be moved along rod-shaped longitudinal guides 54 on the underside of longitudinal frame part 44. The ends of longitudinal guides 54 are attached to the longitudinal frame part 44 with the help of attaching blocks 56,58.

In detail, coupling 52 comprises a base 60 positioned underneath the lower strand of toothed belt 32, and a clamping jaw 62 positioned above the toothed belt. Inside base 60 there is a downwardly open cylindrical hollow space 64, inside which there is a compression spring 66. This compression spring presses against the base 68 of a pressure frame 70 contrived as a rectangular profile section, whose two side surfaces running upwards from base 68 are indicated in the drawing by dash lines. These two side surfaces run, expressed in simplified terms, in front of and behind base part 60 and run upwards to join a horizontal upper part 72. This upper part 72 engages over clamping jaw 62. Pressure spring 66 will therefore try to draw this clamping jaw down against toothed belt 32. On the other hand, there is an air cylinder 74 underneath pressure spring 66, which works against pressure spring 66 and therefore disengages the clamping jaw when compressed air is supplied, and releases toothed belt 32.

We will now describe the way the conveyor device of the invention functions. Depending on the shape, and in particular the orientation of the rear edge of an object for conveying, the individual forward feed latches 42, which can be arranged behind each other in several rows in the direction perpendicular to the plane of the drawing, are moved into their specified starting positions. This is effected by toothed belts 32 being consecutively coupled with shaft 30 via the couplings that are not shown. Shaft 30 can now be rotated until the individual forward feed latches 42 arrive in the desired starting positions from which they will push the object in question forwards. As soon as the individual latches 42 have arrived at their specified positions, toothed belts 32 are uncoupled from shaft 30.

Shaft 30, which, together with the drive motor (not shown), is provided in the first instance as a drive means for rollers 24, i.e. the actual conveying task, can therefore also be used to adjust the individual forward feed latches.

Irrespective of the starting position of the individual forward feed latches, which can basically be selected at will, the forward feed latches can now be moved forward over the same stroke with the help of the respective air cylinders 48. After all toothed belts 32 are disengaged from shaft 30, couplings 52 can be closed. This creates a connection between pistons 50 of air cylinders 48 and the toothed belt 32. Toothed belt 32 is now moved from right to left in the lower strand, and hence from left to right in the upper strand around the toothed belt gear which runs freely in this case. As this happens forward feed latch 42 moves upwards above the conveyor surface as shown, in a manner which needs no further explanation, so that it can take hold of an object for conveying.

Figure 2:
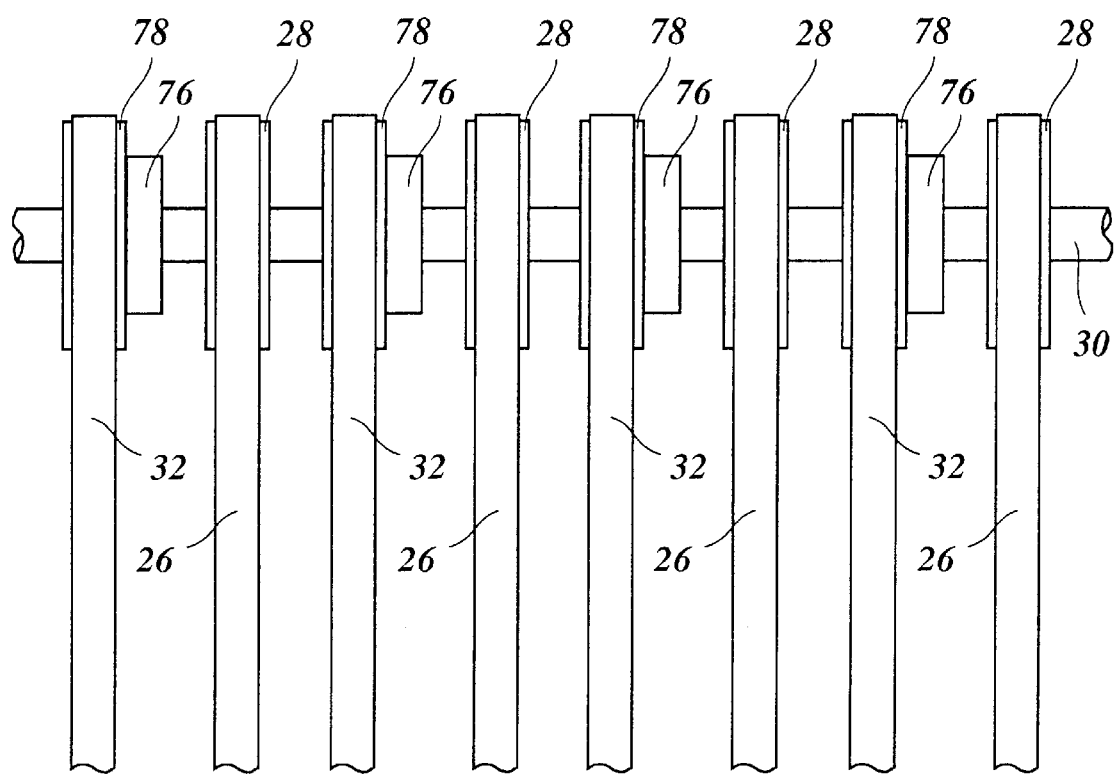
FIG. 2 is a partial top view of the conveyor with a plurality of parts omitted for clarity.

FIG. 2 is a partial top view showing the shaft 30 and a plurality of toothed belt gears 28 supported by the shaft 30. These belt gears 28 are continuously engaged with shaft 30. On the other hand, in alternating arrangement with the belt gears there are further belt gears 78 on the shaft 30 which can be temporarily engaged with the shaft 30 by means of clutches 76 as explained above.

What is claimed is:

1. A conveyor device for precisely moving objects to a desired position on a conveyor surface of the conveyor device, comprising:
    a plurality of forward feed elements for taking hold of the objects by a rear bottom edge thereof in relation to a forward moving direction,
    tension members for moving the forward feed elements into a specified starting position, the tension members being one of:
    a) endless, and
    b) connected via the forward feed elements to an endless strand,
    a common shaft for driving the tension members, said common shaft detachably coupled with the tension members, and
    a separate linear drive for coupling with the tension members for moving the tension members with a stroke of a desired length of displacement of the objects when the tension members are uncoupled from the common shaft.

2. The conveyor device of claim 1, wherein the separate linear drive includes a fluid cylinder.

3. The conveyor device of claim 2,
    further comprising a coupling guided to be movable in a direction of movement of the conveyor device in relation to a base, said coupling having a first operating position in which the coupling takes hold of said tension members and a second operating position in which the coupling releases said tension members, and
    wherein one end of the fluid cylinder is mounted such that said one end is stationary, and an opposite end is connected with said coupling.

4. The conveyor device of claim 3, wherein the coupling is elastically pre-tensioned in the first operating position.

5. The conveyor device of claim 3, wherein the coupling can be disengaged by supplying a pressure medium thereto.

6. The conveyor device of claim 3, wherein the coupling member comprises:

- a base which abuts against the respective tension member from one side thereof and is guided on a frame to be displaceable along the tension member, and
- a clamping jaw which can be drawn towards the base from an opposite side of the tension member.

7. The conveyor device of claim 6, wherein the tension members include toothed belts.

8. The conveyor device of claim 7, wherein the clamping jaw includes teeth on a side closest to the toothed belts.

9. The conveyor device of claim 2, wherein the fluid cylinder includes an air cylinder.

10. The conveyor device of claim 1, further comprising:

- a plurality of driving gears attached to the common shaft and each of the driving gears is encircled by one of the tension members and is drive-connected to the latter, and
- separate couplings assigned to the driving gears for coupling the driving gears separately to the common shaft.

11. The conveyor device of claim 10, wherein the tension members include belts.

12. The conveyor device of claim 11, wherein the tension members include toothed belts.

* * * * *